United States Patent
Eckel et al.

(10) Patent No.: US 6,613,822 B1
(45) Date of Patent: Sep. 2, 2003

(54) FLAME-RESISTANT POLYCARBONATE ABS MOULDING MATERIALS

(75) Inventors: Thomas Eckel, Dormagen (DE); Michael Zobel, Düsseldorf (DE); Dieter Wittmann, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/720,214

(22) PCT Filed: Jun. 12, 1999

(86) PCT No.: PCT/EP99/04062
§ 371 (c)(1), (2), (4) Date: Dec. 21, 2000

(87) PCT Pub. No.: WO00/00544
PCT Pub. Date: Jan. 6, 2000

(30) Foreign Application Priority Data

Jun. 26, 1998 (DE) .......................... 198 28 535

(51) Int. Cl.⁷ ...................... C08K 5/5399; C08K 5/521
(52) U.S. Cl. ...................... 524/116; 524/117; 524/119; 524/127; 524/140; 524/145
(58) Field of Search ................ 524/127, 140, 524/145, 116, 117, 119

(56) References Cited

U.S. PATENT DOCUMENTS

| | | | |
|---|---|---|---|
| 3,001,968 A | * | 9/1961 | Canterino et al. |
| 3,274,014 A | * | 9/1966 | Harrington et al. |
| 3,404,122 A | * | 10/1968 | Fritz et al. |
| 3,475,204 A | * | 10/1969 | Patterson |
| 4,251,436 A | * | 2/1981 | Silberberg et al. |
| 5,013,776 A | * | 5/1991 | Ishihata et al. |
| 5,151,455 A | * | 9/1992 | Miyata et al. |
| 5,234,980 A | * | 8/1993 | Ohira |
| 5,849,827 A | * | 12/1998 | Bodiger et al. |
| 5,912,321 A | | 6/1999 | Raith et al. .......... 528/399 |
| 6,020,081 A | | 2/2000 | Raith et al. .......... 428/704 |
| 6,060,583 A | | 5/2000 | Raith et al. .......... 528/488 |
| 6,326,423 B1 | * | 12/2001 | Eckel et al. |

FOREIGN PATENT DOCUMENTS

| | | |
|---|---|---|
| EP | 728 811 | 8/1996 |
| JP | 06-100785 | * 4/1994 |
| WO | 97/40092 | 10/1997 |

OTHER PUBLICATIONS

*Patent Abstracts of Japan, vol. 018, No. 377 (C–1224) Jul. 15, 1994 & JP 06 100785 A (Asahi Chem Ind Co Ltd) Apr. 12, 1994 & Database WPI Section Ch, Week 9419, Derwent Publications Ltd., London, GB AN 94–156896, XP002116351.

* cited by examiner

Primary Examiner—Peter Szekely
(74) Attorney, Agent, or Firm—Joseph C. Gil; James R. Franks; Aron Preis

(57) ABSTRACT

A thermoplastic molding composition that contains aromatic polycarbonate and/or polyester carbonate, a graft polymer, phosphazene compound, phosphorus compound and fluorinated polyolefin is disclosed. The composition exhibits excellent flame retardance and very good mechanical properties, including weld line strength and impact strength.

14 Claims, No Drawings

FLAME-RESISTANT POLYCARBONATE ABS MOULDING MATERIALS

The present invention relates to polycarbonate/ABS moulding compositions with incorporated phosphazenes and phosphorus compounds, which compositions exhibit excellent flameproofing and very good mechanical properties such as weld line strength or notched impact strength.

DE-A 196 16 968 describes polymerisable phosphazene derivatives, a process for the production thereof and the use thereof as curable binders for lacquers, coatings, fillers, surfacing compositions, adhesives, mouldings or films.

WO 97/400 92 describes flameproofed moulding compositions prepared from thermoplastic polymers and unsubstituted phosphazenes (of the type $PN_{n-x}H_{1-y}$).

EP-A 728 811 describes a thermoplastic blend consisting of aromatic polycarbonate, graft copolymer, copolymer and phosphazenes which exhibits good flameproofing properties, impact strength and heat resistance.

Neither WO 97400 92 nor EP-A 728 811 describe a combination of phosphazenes and phosphorus compounds.

The object of the present invention is to provide polycarbonate/ABS moulding compositions having excellent flame resistance and weld line strength, excellent mechanical properties such as notched impact strength and stress cracking resistance. This range of properties is required in particular for applications in data processing, such as for example casings for monitors, printers, copiers etc.

It has now been found that PC/ABS moulding compositions which contain phosphazenes in combination with phosphorus compounds and/or salts of phosphate compounds exhibit the desired properties.

The present invention accordingly provides thermoplastic moulding compositions containing A) 40 to 99, preferably 60 to 98.5 parts by freight of aromatic polycarbonate and/or polyester carbonate B) 0.5 to 60, preferably 1 to 40, in particular 2 to 25 parts by weight of graft polymer of B.1) 5 to 95, preferably 30 to 80 wt. % of one or more vinyl monomers on B.2) 95 to 5, preferably 20 to 70 wt. % of one or more grafting backbones having a glass transition temperature of <10° C., preferably of <0° C., particularly preferably of <−20° C., C) 0 to 45, preferably 0 to 30, particularly preferably 2 to 25 parts by weight of at least one thermoplastic polymer selected from the group composing vinyl (co) polymers and polyalkylene terephthalates.

D) 0.1 to 50, preferably 2 to 35, in particular 5 to 25 parts by weight of at least one component selected from the group comprising phosphazenes of the formulae (Ia)

$$R-\overset{R}{\underset{R}{P}}=N-\left[\overset{R}{\underset{R}{P}}=N\right]_k-\overset{R}{\underset{R}{P}}\diagup \overset{R}{\diagdown R},$$

(Ib)

$$\text{(cyclic phosphazene structure with } [P=N]_k \text{ and R substituents)}$$

in which
R is in each case identical or different and denotes amino. $C_1$ to $C_9$ alkyl, in each case optionally halogenated, preferably halogenated with fluorine, or $C_1$ to $C_4$ alkoxy, $C_5$ to $C_6$ cycloalkyl, $C_6$ to $C_{20}$ aryl, preferably phenyl or naphthyl, $C_6$ to $C_{20}$ aryloxy, preferably phenoxy, naphthyloxy, or $C_7$ to $C_{12}$ aralkyl, preferably phenyl-$C_1$–$C_4$-alkyl, in each case optionally substituted by alkyl, preferably $C_1$–$C_4$-alkyl, and/or halogen, preferably chlorine and,or bromine k denotes 0 or a number from 1 to 15, preferably a number from 1 to 10, E) 0.5 to 20 parts by weight, preferably 1 to 18 parts by weight, particularly preferably 2 to 15 parts by weight selected from at least one phosphorus compound of the general formulae (IIa), (IIb), (IIc) and (IId), (IIa)

$$R^1-(O)_n-\underset{\underset{R^2}{\overset{(O)_n}{|}}}{\overset{\overset{O}{\|}}{P}}-\left[O-X-O-\underset{\underset{R^3}{\overset{(O)_n}{|}}}{\overset{\overset{O}{\|}}{P}}\right]_N-(O)_n-R^4,$$

in which
$R^1$, $R^2$, $R^3$ and $R^4$ mutually independently denote $C_1$ to $C_8$ alkyl, in each case optionally halogenated, $C_5$ to $C_6$ cycloalkyl, $C_6$ to $C_{20}$ aryl or $C_7$ to $C_{12}$ aralkyl, in each case optionally substituted by alkyl, preferably $C_1$–$C_4$ alkyl, and/or halogen, preferably chlorine, bromine, n mutually independently mean 0 or 1

N means 0 to 30 and

X means a mono- or polycyclic aromatic residue having 6 to 30 C atoms.

(IIb)

$$R^5O-\overset{\overset{O}{\|}}{P}\diagup\overset{O}{\diagdown O}\diagup Me$$

(IIc)

$$R^6O-\overset{\overset{O}{\|}}{P}\diagup\overset{OMe}{\diagdown OMe}$$

(IId)

$$\left[\underset{R^6-O}{\overset{R^5-O}{\diagdown}}\overset{\overset{O}{\|}}{P}-O\right]_q Me$$

in which
$R^5$ and $R^6$ mutually independently mean optionally halogenated $C_1$–$C_{24}$ alkyl, $C_5$–$C_6$ cycloalkyl, $C_6$–$C_{20}$ aryl or $C_7$–$C_{12}$ aralkyl, in each case optionally substituted by halogen and, or $C_1$–$C_{10}$ alkyl, or R⁵ and R⁶ in the case of the formula (IId) form an alkylene chain, preferably having up to 6, in particular 2 or 3 carbon atoms, Me denotes a metal selected from main groups 1 to 3 and subgroups VIII, 1B and 2B of the periodic system, and q is determined by the valency of the metal ion, F 0.05 to 5, preferably 0.1 to 1, particularly preferably 0.1 to 0.5 parts by weight of fluorinated polyolefin.

Component A

Component A aromatic polycarbonates and/or aromatic polyester carbonates which are suitable according to the invention are known from the literature or may be produced using processes known from the literature (c.f. in relation to the production of aromatic polycarbonates, for example Schnell, *Chemistry, & Physics of Polycarbonates*, Interscience Publishers, 1964 and DE-AS 1 495 626, DE-OS 2 232 877, DE-OS 2 703 376, DE-OS 2 714 544, DE-OS 3 000 610, DE-OS 3 832 396; in relation to the production of aromatic polyester carbonates for example DE-OS 3 077 934).

Aromatic polycarbonates are produced for example by reacting diphenols with carbonic acid halides, preferably phosgene, and/or with aromatic dicarboxylic acid dihalides, preferably benzenedicarboxylic acid dihalides, by the phase interface process, optionally using chain terminators, for example monophenols, and optionally using trifunctional or greater than trifunctional branching agents for example triphenols or tetraphenols.

Diphenols for the production of the aromatic polycarbonates and/or aromatic polyester carbonates are preferably those of the formula (III)

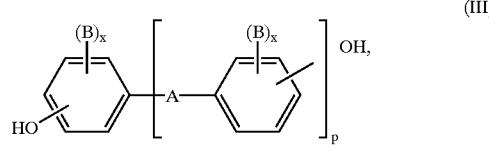

(III)

wherein

A means a single bond, $C_1$–$C_5$ alkylene, $C_2$–$C_5$ alkylidene, $C_5$–$C_6$ cycloalkylidene, —O—, —SO—, —CO—, —S—, —SO₂—, $C_6$–$C_{12}$ arylene, onto which further aromatic rings optionally containing heteroatoms may be fused.

or a residue of the formula (IV) or (V)

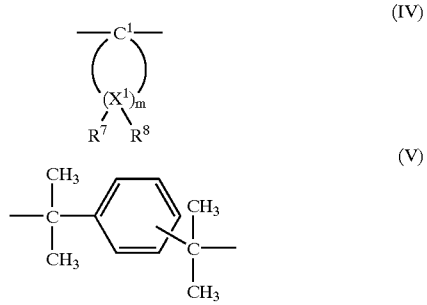

B in each case means $C_1$–$C_{12}$ alkyl, preferably methyl, halogen, preferably chlorine and/or bromine x in each case mutually independently mean 0, 1 or 2, p means 1 or 0 and R⁷ and R⁸ mutually independently, individually selectably for each X¹, mean hydrogen or $C_1$–$C_6$ alkyl, preferably hydrogen, methyl or ethyl, X¹ means carbon and m means an integer from 4 to 7, preferably 4 or 5, providing that R⁷ and R⁸ are simultaneously alkyl on at least one atom X¹.

Preferred diphenols are hydroquinone, resorcinol, dihydroxydiphenols, bis-(hydroxy-phenyl)-$C_1$–$C_5$-alkanes, bis-(hydroxyphenyl)-$C_5$–$C_6$-cycloalkanes, bis-(hydroxyphenyl) ethers, bis-(hydroxyphenyl) sulfoxides, bis-(hydroxyphenyl) ketones, bis-(hydroxy-phenyl) sulfones and α,α-bis-(hydroxyphenyl)diisopropylbenzenes together with the ring-brominated and/or ring-chlorinated derivatives thereof.

Particularly preferred diphenols are 4,4'-dihydroxydiphenyl, bisphenol A, 2,4-bis-(4-hydroxyphenyl)-2-methylbutane, 1,1-bis-(4-hydroxyphenyl)cyclohexane, 1,1-bis-(4-hydroxyphenyl)-3,3,5-trimethylcyclohexane, 4,4'-dihydroxydiphenyl sulfide, 4,4'-dihydroxydiphenyl sulfone together with the di- and tetrabrominated or chlorinated derivatives thereof, such as for example 2,2-bis-(3-chloro-4-hydroxyphenyl)propane, 2,2-bis-(3,5-dichloro-4-hydroxyphenyl)propane or 2,2-bis-(3,5-dibromo-4-hydroxy-phenyl)propane.

2,2-Bis-(4-hydroxyphenyl)propane (bisphenol A) is particularly preferred.

The diphenols may be used individually or as any desired mixtures.

The diphenols are known from the literature or are obtainable using processes known from the literature.

Chain terminators suitable for the production of the thermoplastic, aromatic polycarbonates are, for example, phenol, p-chlorophenol, p-tert.-butylphenol or 2,4,6-tribromophenol, as well as long-chain alkylphenols, such as 4-(1,3-tetramethylbutyl)-phenol according to DE-OS 2 842 005 or monoalkylphenol or dialkyphenols having a total of 8 to 20 C atoms in the alkyl substituents, such as 3,5-di-tert.-butylphenol, p-iso-octylphenol, p-tert.-octylphenol, p-dodecylphenol and 2-(3,5-dimethylheptyl)-phenol and 4-(3,5-dimethylheptyl)phenol. The quantity of chain terminators to be used is generally between 0.5 mol % and 10 mol %, relative to sum of moles of the diphenols used in each case.

The thermoplastic, aromatic polycarbonates have weight average molecular weights ($Me_w$, measured for example by ultracentrifugation or light scattering) of 10000 to 200000, preferably of 20000 to 80000.

The thermoplastic, aromatic polycarbonates may be branched in a known manner, in particular preferably by incorporating 0.05 to 2.0 mol %, relative to the sum of diphenols used, of trifunctional or greater than trifunctional compounds, for example those having three and more than three phenolic groups.

Both homopolycarbonates and copolycarbonates are suitable. Component A copolycarbonates according to the invention may be produced by also using 1 to 25 wt. %, preferably 2.5 to 25 wt. % (relative to the total quantity of diphenols to be used) of polydiorganosiloxanes having hydroxy-aryloxy end groups. These are known (c.f. for example U.S. Pat. No. 3,419,634) or may be produced using processes known from the literature. The production of copolycarbonates containing polydiorgano-siloxanes is described, for example, in DE-OS 3 334 782.

Preferred polycarbonates, apart from bisphenol A homopolycarbonates, are copolycarbonates of bisphenol A with up to 15 mol %, relative to the sum of moles of diphenols, of other diphenols mentioned as preferred or particularly preferred, in particular 2,2-bis-(3,5-dibromo-4-hydroxyphenyl)propane.

Aromatic dicarboxylic acid dihalides for the production of aromatic polyester carbonates are preferably the diacid dichlorides of isophthalic acid, terephthalic acid, diphenyl ether 4,4'-dicarboxylic acid and 2,6-naphthalenedicarboxylic acid.

Mixtures of the diacid dichlorides of isophthalic acid and terephthalic acid in a ratio of between 1:20 and 20:1 are particularly preferred.

A carbonic acid halide, preferably phosgene, is additionally used as a difunctional acid derivative in the production of polyester carbonates.

Chain terminators which may be considered for the production of the aromatic polyester carbonates are, apart from the above-mentioned monophenols, also the chlorocarbonic acid esters thereof and the acid chlorides of aromatic monocarboxylic acids, which may optionally be substituted by $C_1$–$C_{22}$ alkyl groups or by halogen atoms, together with aliphatic $C_2$–$C_{22}$ monocarboxylic acid chlorides.

The quantity of chain terminators is in each case 0.1 to 10 mol %, relative, in the case of phenolic chain terminators, to the number of moles of diphenols and, in the case of monocarboxylic acid chloride chain terminators, to the number of moles of dicarboxylic acid dichlorides.

The aromatic polyester carbonates may also contain incorporated aromatic hydroxycarboxylic acids.

The aromatic polyester carbonates may be both linear and branched in a known manner (c.f. in this connection also DE-OS 2 940 024 and DE-OS 3 007 934).

Branching agents which may be used are, for example, tri- or polyfunctional carboxylic acid chlorides, such as trimesic acid trichloride, cyanuric acid trichloride, 3,3',4,4'-benzophenonetetracarboxylic acid tetrachloride, 1,4,5,8-naphthalenetetra-carboxylic acid tetrachloride or pyromellitic acid tetrachloride, in quantities of 0.01 to 1.0 mol % (relative to dicarboxylic acid dichliorides used) or tri- or polyfunctional phenols, such as phloroglucinol, 4,6-dimethyl-2,4,6-tri-(4-hydroxyphenyl)-2-heptene, 4,4-dimethyl-2,4,6-tri-(4-hydroxyphenyl)heptane, 1,3,5 -tri-(4-hydroxyphenyl)benzene, 1,1,1-tri-(4-hydroxyphenyl)ethane, tri-(4-hydroxy-phenyl)phenylmethane, 2,2-bis-[4,4-bis-(4-hydroxyphenyl)cyclohexyl]propane, 2,4-bis-(4-hydroxyphenylisopropyl)phenol, tetra-(4-hydroxyphenyl)methane, 2,6-bis-(2-hydroxy-5-methylbenzyl)-4-methylphenol, 2-(4-hydroxyphenyl)-2-(2,4-dihydroxyphenyl)propane, tetra-(4-[4-hydroxyphenylisopropyl]phenoxy)methane, 1,4-bis[4,4'-dihydroxytriphenyl)methyl]benzene, in quantities of 0.01 to 1.0 mol %, relative to diphenols used. Phenolic branching agents may be introduced initially with the diphenols, acid chloride branching agents may be introduced together with the acid dichlorides.

The proportion of carbonate structural units in the thermoplastic, aromatic polyester carbonates may be varied at will. The proportion of carbonate groups is preferably up to 100 mol %, in particular up to 80 mol %, particularly preferably up to 50 mol %, relative to the sum of ester groups and carbonate groups. Both the ester and carbonate fractions of the aromatic polyester carbonates may be present in the form of blocks or randomly distributed in the polycondensation product.

The relative solution viscosity ($\eta_{rel}$) of the aromatic polycarbonates and polyester carbonates is in the range from 1.18 to 1.4, preferably from 1.22 to 1.3 (measured on solutions of 0.5 g of polycarbonate or polyester carbonate in 100 ml of methylene chloride solution at 25° C.).

The thermoplastic, aromatic polycarbonates and polyester carbonates may be used alone or as any desired mixture with each other.

Component B

Component B comprises one or more graft polymers of

B.1 5 to 95, preferably 30 to 80 wt. %, of at least one vinyl monomer on

B.2 95 to 5, preferably 70 to 20 wt. %, of one or more graft backbones having glass transition temperatures of <10° C., preferably of <0° C., particularly preferably of <–20° C.

The grafting backbone B.2 generally has an average particle size ($d_{50}$ value) of 0.05 to 5 μm, preferably of 0.10 to 0.5 μm, particularly preferably of 0.20 to 0.40 μm.

Monomers B.1 are preferably mixtures of

B.1 50 to 99 parts by weight of vinyl aromatics and/or ring-substituted vinyl aromatics (such as for example styrene, α-methylstyrene, p-methylstyrene, p-chlorostyrene) and/or methacrylic acid ($C_1$–$C_4$)-alkyl esters (such as for example methyl methacrylate, ethyl methacrylate) and B.1.2 1 to 50 parts by weight of vinyl cyanides (unsaturated nitriles such as acrylonitrile and methacrylonitrile) and/or (meth)acrylic acid ($C_1$–$C_8$)-alkyl esters (such as for example methyl methacrylate, n-butyl acrylate, t-butyl acrylate) and/or derivatives (such as anhydrides and imides) of unsaturated carboxylic acids (for example maleic anhydride and N-phenylmaleimide).

Preferred monomers B.1.1 are selected from among at least one of the monomers styrene, α-methylstyrene and methyl methacrylate, preferred monomers B.1.2 are selected from among at least one of the monomers acrylonitrile, maleic anhydride and methyl methacrylate.

Particularly preferred monomers are B.1.1 styrene and B.1.2 acrylonitrile.

Grafting backbones B.2 suitable for the graft polymers B are for example diene rubbers, EP(D)M rubbers, i.e. those based on ethylene/propylene and optionally diene. acrylate, polyurethane, silicone, chloroprene and ethylene/vinyl acetate rubbers.

Preferred grafting backbones B.2 are diene rubbers (for example based on butadiene, isoprene etc.) or mixtures of diene rubbers or copolymers of diene rubbers or mixtures thereof with further copolymerisable monomers (for example according to B.1.1 and B.1.2), providing that the glass transition temperature of component B.2 is <10° C., preferably <0° C., particularly preferably <–10° C.

Pure polybutadiene rubber is particularly preferred.

Particularly preferred polymers B are, for example, ABS polymers (emulsion, bulk and suspension ABS), as are described for example in DE-OS 2 035 390 (=U.S. Pat. No. 3,644,574) or in DE-OS 2 248 242 (=GB-PS 1 409 275) or in Ullmann, *Enzyklopadie der Technischen Chlemie*, volume 19 (1980), pp. 280 et seq. The gel content of the grafting backbone B.2 is at least 30 wt. %, preferably at least 40 wt. % (measured in toluene).

The graft copolymers B are produced by free-radical polymerisation, for example by emulsion, suspension, solution or bulk polymerisation, preferably by emulsion polymerisation.

Particularly suitable graft rubbers are ABS polymers which arc produced by redox initiation using an initiator system comprising organic hydroperoxide and ascorbic acid according to U.S. Pat. No. 4,937,285.

Since, as is known, the graft monomers are not necessarily grafted in their entirety onto the grafting backbone during the grafting reaction, graft polymers B are also taken according to the invention to include those products which are obtained by (co)polyrnerisation of the graft monomers in the presence of the grafting backbone and are also isolated during working up.

Suitable polymer B acrylate rubbers B.2 are preferably polymers prepared from acrylic acid alkyl esters, optionally with up to 40 wt. %, relative to B.2, of other polymerisable, ethylenically unsaturated monomers. Preferred polymerisable acrylic acid esters include $C_1$–$C_8$ alkyl esters, for example methyl, ethyl, butyl, n-octyl and 2-ethylhexyl esters; haloalkyl esters, preferably halo-$C_1$–$C_8$-alkyl esters, such as chloroethyl acrylate and mixtures of these monomers.

Monomers having more than one polymerisable double bond may also be copolymerised for crosslinking purposes. Preferred examples of crosslinking monomers are esters of unsaturated monocarboxylic acids having 3 to 8 C atoms and unsaturated monohydric alcohols having 3 to 12 C atoms, or saturated polyols having 2 to 4 OH groups and 2 to 20 C atoms, such as for example ethylene glycol dimethacrylate, allyl methacrylate; polyunsaturated heterocyclic compounds, such as for example trivinyl and triallyl cyanurate; polyfunctional vinyl compounds, such as di- and trivinylbenzenes; as well as triallyl phosphate and diallyl phthalate.

Preferred crosslinking monomers are allyl methacrylate, ethylene glycol dimethacrylate, diallyl phthalate and heterocyclic compounds having at least three ethylenically unsaturated groups.

Particularly preferred crosslinking monomers are the cyclic monomers triallyl cyanurate, triallyl isocyanurate, triacryloylhexahydro-s-triazine, triallylbenzenes. The quantity of crosslinking monomers is preferably 0.02 to 5, preferably 0.05 to 2 wt. %, relative to the grafting backbone B.2.

It is advantageous to limit the quantity of cyclic crosslinking monomers having at least three ethylenically unsaturated groups to below 1 wt. % of the grafting backbone B.2.

Preferred "other" polymerisable, ethylenically unsaturated monomers which, in addition to the acrylic acid esters, may optionally be used to produce the grafting backbone B.2 are, for example, acrylonitrile, styrene, α-methylstyrene, acrylamides, vinyl $C_1$–$C_6$-alkyl ethers, methyl methacrylate, butadiene. Preferred acrylate rubbers as the grafting backbone B.2 are emulsion polymers having a gel content of at least 60 wt. %.

Further suitable grafting backbones B.2 are silicone rubbers having active grafting sites, as are described in DE-OS 3 704 657, DE-OS 3 704 655, DE-OS 3 631 540 and DE-OS 3 631 539.

The gel content of the grafting backbone B.2 is determined in a suitable solvent (M. Hoffmann, H. Krömer, R. Kuhn, *Polyomeranalvtik I & II*, Georg Thieme Verlag, Stuttgart 1977).

The average particle size $d_{50}$ is the diameter both above and below which 50 wt. % of the particles lie. This value may be measured by ultracentrifugation (W. Scholtan, 1H. Lange, *Kolloid Z. und Z. Polymere*, 250 (1972), 782–1796).

Component C

Component C comprises one or more thermoplastic vinyl (co)polymers C.1. and/or polyalkylene terephthalates C.2.

Suitable vinyl (co)polymers C.1 are polymers of at least one monomer from the group of vinyl aromatics, vinyl cyanides (unsaturated nitrites), (meth)acrylic acid ($C_1$–$C_8$)-alkyl esters, unsaturated carboxylic acids and derivatives (such as anhydrides and imides) of unsaturated carboxylic acids. Particularly suitable (co)polymers are those prepared from C.1.1 50 to 99, preferably 60 to 80 parts by weight of vinyl aromatics and/or ring-substituted vinyl aromatics such as for example styrene, α-methylstyrene p-methylstyrene, p-chlorostyrene) and/or methacrylic acid ($C_1$–$C_8$)-alkyl esters such as for example methyl methacrylate, ethyl methacrylate) and C.1.2 1 to 50, preferably 20 to 40 parts by weight of vinyl cyanides (unsaturated nitrites) such as acrylonitrile and methacrylonitrile and/or (meth)acrylic acid ($C_1$–$C_8$)-alkyl esters (such as for example methyl methacrylate, n-butyl acrylate, t-butyl acrylate) and/or unsaturated carboxylic acids (such as maleic acid) and/or derivatives (such as anhydrides and imides) of unsaturated carboxylic acids (for example maleic anhydride and N-phenylmaleimide).

The (co)polymers C.1 are resinous, thermoplastic and rubber-free.

The copolymer of C.1.1 styrene and C.1.2 acrylonitrile is particularly preferred.

The (co)polymers C.1 are known and may be produced by free-radical polymerisation, in particular by emulsion, suspension, solution or bulk polymerisation. The (co)polymers preferably have molecular weights $\overline{M}_w$ (weight average, determined by light scattering or sedimentation) of between 15000 and 200000.

The component C.2 polyalkylene terephthalates are reaction products of aromatic dicarboxylic acids or the reactive derivatives thereof, such as dimethyl esters or anhydrides, and aliphatic, cycloaliphatic or aralphatic diols, together with mixtures of these reaction products.

Preferred polyalkylene terephthalates contain at least 80 wt. %, preferably at least 90 wt. %, relative to the dicarboxylic acid component, of terephthalic acid residues and at least 80 wt. %, preferably at least 90 mol %, relative to the diol component, of ethylene glycol and/or 1,4-butanediol residues.

In addition to terephthalic acid residues, the preferred polyalkylene tereplithalates may contain up to 20 mol %, preferably up to 10 mol %, of residues of other aromatic or cycloaliphatic dicarboxylic acids having 8 to 14 C atoms or aliphatic dicarboxylic acids having 4 to 12 C atoms, such as for example residues of phthalic acid, isophthalic acid, 2,6-naphthalenedicarboxylic acid, 4,4'-diphenyldicarboxylic acid, succinic acid, adipic acid, sebacic acid, azelaic acid, cyclohexanediacetic acid.

In addition to ethylene glycol or 1,4-butanediol residues, the preferred polyalkylene terephthalates may contain up to 20 mol %, preferably up to 10 mol %, of other aliphatic diols having 3 to 12 C atoms or cycloaliphatic diols having 6 to 21 C atoms, for example residues of 1,3-propanediol, 2-ethyl-1,3-propanediol, neopentyl glycol, 1,5-pentanediol, 1,6-hexanediol, 1,4-cyclohexanedimethanol, 3-ethyl-2,4-pentanediol, 2-methyl-2,4-pentanediol, 2,2,4-trimethyl-1,3-pentanediol, 2-ethyl-1,3-hexanediol, 2,2-diethyl-1,3-propanediol, 2,5-hexanediol, 1,4-di-(β-hydroxyethoxy)benzene, 2,2-bis-(4-hydroxycyclohexyl)propane, 2,4-dihydroxy-1,1,3,3-tetramethylcyclobutane, 2,2-bis-(4-β-hydroxyethoxyphenyl)propane and 2,2-bis-(4-hydroxypropoxyphenyl)-propane (DE-OS 2 407 674, 2 407 776, 2 715 932).

The polyalkylene terephthalates may be branched by incorporating relatively small quantities of tri- or tetrahydric alcohols or tri- or tetrabasic carboxylic acids, for example according to DE-OS 1 900 270 and U.S. Pat. No. 3,692,744. Further preferred branching agents are trimesic acid, trimellitic acid, trimethylolethane and trimethylolpropane and pentaerythritol.

Particularly preferred polyalkylene terephthalates are those solely produced from terephthalic acid and the reactive derivatives thereof (for example the dialkyl esters thereof) and ethylene glycol and/or 1,4-butanediol, and mixtures of these polyalkylene terephthalates.

Mixtures of polyalkylene terephthalates contain 1 to 50 wt. %, preferably 1 to 30 wt. %, of polyethylene terephthalate and 50 to 99 wt. %, preferably 70 to 99 wt. %, of polybutylene terephthalate.

The preferably used polyalkylene tereplithalates generally hive an intrinsic viscosity of 0.4 to 1.5 dl/g, preferably of O05 to 1.2 dl/g, measured in phenol/o-dichlorobenzene (1:1 parts by weight) at 25° C. in a Ubbelohde viscosimeter.

The polyalkylene terephthalates may be produced using known methods (c.f. for example *Kunststoff-Handbuch*, volume VIII, pp. 695 et seq., Carl Hanser Verlag, Munich 1973).

Component D

Component D phosphazenes which are used according to the present invention are linear phosphazenes of the formula (Ia) and cyclic phosphazenes of the formula (Ib)

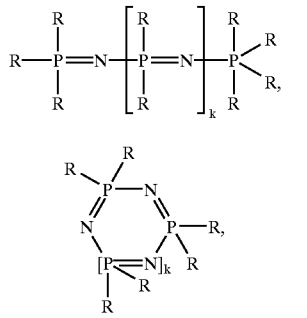

wherein k and R have the above-stated meaning

The following may be mentioned by way of example:

propoxyphosphazene, phenoxyphosphazene, methylphenoxyphospilazene, amino-phosphazene and fluoroalkylphosphazenes.

Phenoxyphosphazene is preferred.

The phosphazenes may be used alone or as a mixture. The residue R may always be identical or two or more residues in the formula (Ia) and (Ib) may be different.

The phosphazenes and the production thereof are described, for example, in EP-A 10 728 811, DE-A 1 961 668 and WO 97/40092.

Component E

Component E comprises one or more phosphorus compounds or a mixture of at least one mono- and at least one oligomeric phosphors compound of the above-stated formulae (IIa), (IIb), (IIc) and (IId).

$R^1$, $R^2$, $R^3$ and $R^4$ in the formula (IIa) have the above-stated meanings. $R^1$, $R^2$ $R^3$ and $R^4$ preferably mutually independently denote $C_1$–$C_4$ alkyl, phenyl, naphthyl or phenyl-$C_1$–$C_4$-alkyl. The aromatic groups $R^1$, $R^2$, $R^3$ and $R^4$ may in turn be substituted with halogen and/or alkyl groups, preferably chlorine, bromine and/or be $C_1$–$C_4$-alkyl substituted. Particularly preferred aryl residues are cresyl, phenyl, xylenyl, propylphenyl or butylphenyl together with the corresponding brominated and chlorinated derivatives thereof.

X in the formula (IIa) means a mono- or polycyclic aromatic residue having 6 to 30 C atoms. This residue is preferably derived from diphenols of the formula (III), such as for example diphenylphenol, bisphenol A or from resorcinol or hydroquinone or the chlorinated or brominated derivatives thereof.

n in the formula (IIa) may mutually independently mean 0 or 1, n preferably equals 1.

N denotes values from 0 to 30, preferably an average value of 0.3 to 20, particularly preferably from 0.5 to 10, in particular from 0.5 to 6.

Mixtures prepared from preferably 10 to 90 wt. %, preferably 12 to 40 wt. %, of at least one monophosphorus compound and at least one oligomeric phosphorus compound of the formula (IIa) or a mixture of oligomeric phosphorus compounds in quantities of 10 to 90 wt. %, preferably of 60 to 88 wt. %, relative to the total quantity of phosphorus compounds, are in particular used as component E according to the invention.

Monophosphorus compounds of the formula (IIa) are in particular tributyl phosphate, tris-(2-chloroethyl) phosphate, tris-(2,3-dibromopropyl) phosphate, triphenyl phosphate, tricresyl phosphate, diphenylcresyl phosphate, diphenyloctyl phosphate, diphenyl-2-ethylcresyl phosphate, tri-(isopropylphenyl) phosphate, halo-substituted aryl phosphates, methylphosphonic acid dimethyl ester, methylphosphenic acid diphenyl ester, phenylphosphonic acid diethyl ester, triphenylphosphine oxide or tricresylphosphine oxide.

The mixtures of monomeric and oligomeric phosphorus compounds of the formula (I) have average N values of 0.3 to 20, preferably of 0.5 to 10, in particular of 0.5 to 6.

The component E phosphorus compounds are known (c.f. for example EP-A 363 608, EP-A 640 655) or may be produced in an analogous manner using known methods (for example *Ullmanns Encyklopädie der technischen Chemie*, volume 18, pp. 301 et seq. 1979; Houben-Weyl, *Methoden der organischen Chemie*, volume 12/1, p. 43; *Beilstein*, volume 6, p. 177).

The moulding compositions according to the invention may contain metal compounds of monoesters of phosphoric acid of the formula (IIb) and/or (IIc),

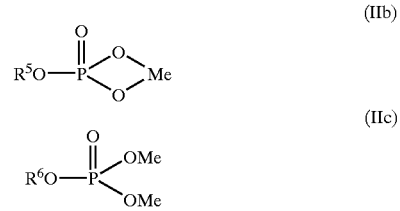

or metal compounds of diesters of phosphoric acid of the formula (IId)

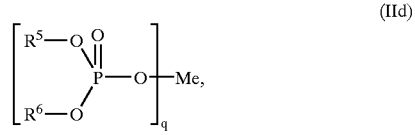

in which $R^5$ and $R^6$, Me and q have the above-stated meaning as the phosphorus compounds.

$R^5$ and $R^6$ preferably mutually independently denote optionally, halogenated (preferably by chlorine and/or bromine) $C_1$–$C_{15}$, in particular $C_1$–$C_{10}$, alkyl, cyclopentyl, cyclohexyl, phenyl, naphthyl, phenyl-$C_1$–$C_4$-alkyl (Such as benzyl), in each case optionally substituted by halogen (preferably chlorine and/or bromine) and/or $C_1$–$C_6$, in particular $C_1$–$C_4$, alkyl, in particular methyl, ethyl.ni-, isopropyl.

$R_5$ and $R^6$ particularly preferably, multually independently denote cresyl, phenyl, xylenyl, propylphenyl or butylphenyl together with the corresponding brominated and chlorinated derivatives thereof.

Main groups 1 to 3 and subgroups VIII, IB and IIB, of the periodic system (according to Mendeleyev) constitute suitable metals, metals from main groups 2 and 3 and subgroup II being preferred.

Compounds of the metals Mg, Ca, Ba, boron, Al and Zn are particularly preferred.

Suitable methods for the production of the phosphoric acid ester metal compounds according to the invention are those known from the literature, such as for example the transesterification process starting from triesters of phosphoric acid or the acid halide process starting from phosphoryl chloride (EP-A 0 801 116, *J. Org. Chem.* 1978, volume 43, no. 1, pp. 24–31).

The inorganic reaction components are preferably used in ultra-finely divided form in the production of the phosphoric acid esters according to the invention. Average particle diameters are $\leq 1$ μm, preferably $\leq 200$ nm.

Component F

The fluorinated polyolefins F are of a high molecular weight and have glass transition temperatures of above $-30°$ C., generally of above $100°$ C., fluorine contents preferably of 65 to 76, in particular of 70 to 76 wt. %, average particle diameters $d_{50}$ of 0.05 to 1000, preferably of 0.08 to 20 μm. The fluorinated polyolefins F generally have a density of 1.2 to 2.3 g/cm$^3$. Preferred fluorinated polyolefins F are polytetrafluoroethylene, polyvinylidene fluoride, tetrafluoroethylene/hexafluoro-propylene and ethylene/tetrafluoroethylene copolymers. The fluorinated polyolefins are known (c.f. *Vinyl & Related Polymers* by Schildknecht, John Wiley & Sons Inc., New York, 1962, pp. 484–494; *Fluoropolymers* by Wall, Wiley-Interscience, John Wiley & Sons Inc., New York, volume 13, 1970, pp. 623–654; *Modern Plastics Encyclopedia*, 1970–1971, volume 47, no. 10 A, October 1970, McGraw-Hill Inc., New York, pp. 134 and 774; *Modern Plastics Encyclopedia*, 1975–1976, October 1975, volume 52, no. 10A, McGraw-Hill Inc., New York, pp. 27, 28 and 472 and U.S. Pat. Nos. 3,671,487, 3,723,373 and 3,838,092).

They may be produced using known processes, thus for example by polymerising tetrafluoroethylene in an aqueous medium with a free-radical forming catalyst, for example sodium, potassium or ammonium peroxydisulfate, at pressures of 7 to 71 kg/cm$^2$ and at temperatures of 0 to 200° C., preferably at temperatures of 20 to 100° C. (c.f. for example U.S. Pat. No. 2,393,967 for further details). Depending upon the form in which they are used, the density of these materials may be between 1.2 and 2.3 g/cm$^3$, the average particle size between 0.5 and 1000 μm.

Fluorinated polyolefins F preferred according to the invention are tetrafluoroethylene polymers having average particle diameters of 0.05 to 20 μm, preferably of 0.08 to 10 μm, and a density of 1.2 to 1.9 g/cm$^3$ and are preferably used in the form of a coagulated mixture of emulsions of tetrafluoroethylene polymers F with emulsions of the graft polymers B.

Suitable fluorinated polyolefins F usable in powder form are tetrafluoroethylene polymers having average particle diameters of 100 to 1000 μm and densities of 2.0 g/cm$^3$ to 2.3 g/cm$^3$.

A coagulated mixture of B and F is produced by firstly mixing an aqueous emulsion (latex) of a graft polymer B with a finely divided emulsion of a tetraethylene polymer F; suitable tetrafluoroethylene polymer emulsions conventionally have solids contents of 30 to 70 wt. %, in particular of 50 to 60 wt. % preferably of 30 to 35 wt. %.

The quantity stated in the description of component B may include the proportion of the graft polymer for the coagulated mixture prepared from the graft polymer and fluorinated polyolefin.

The weight ratio of graft polymer B to tetrafluoroethylene polymer F in the emulsion mixture is 95:5 to 60:40. The emulsion mixture is then coagulated in a known manner, for example by spray drying, freeze drying or coagulation by addition of inorganic or organic salts, acids, bases or organic, water-miscible solvents, such as alcohols, ketones, preferably at temperatures of 20 to 150° C., in particular of 50 to 100° C. If necessary, drying may be performed at 50 to 200° C., preferably at 70 to 100° C.

Suitable tetrafluoroethylene polymer emulsions are conventional commercial products and are offered for sale, for example, by DuPont as Teflon® 30 N.

The moulding compositions according to the invention may contain at least one of the conventional additives, such as lubricants and mould release agents, nucleating agents, antistatic agents, stabilisers as well as dyes and pigments.

The moulding compositions according to the invention may contain up to 35 wt. %, relative to the overall moulding composition, of a further, optionally synergistic flame retardant. Examples of further flame retardants which may be mentioned are organic halogen compounds, such as decabromobisphenyl ether, tetrabromobisphenol, inorganic halogen compounds such as ammonium bromide, nitrogen compounds, such as melamine, melamine/formaldehyde resins, inorganic hydroxide compounds, such as Mg, Al hydroxide, inorganic compounds such as antimony oxides, barium metaborate, hydroxoantimonate, zirconium oxide, zirconium hydroxide, molybdenum oxide, ammonium molybdate, zinc borate, ammonium borate, barium metaborate, talc, silicate, silicon oxide and tin oxide, as well as siloxane compounds.

The moulding compositions according to the invention containing components A to F and optionally further known additives such as stabilisers, dyes, pigments, lubricants and mould release agents, nucleating agents, as well as antistatic agents, are produced by mixing the particular constituents in a known manner and melt-compounding and melt-extruding them at temperatures of 200° C. to 300° C. in conventional units such as internal kneaders, extruders and twin-screw extruders, wherein component F is preferably used in the form of the above-mentioned coagulated mixture.

The individual constituents may be mixed in a known manner both in succession and simultaneously and both at approx. 20° C. (room temperature) and at a higher temperature.

The present invention accordingly also provides a process for the production of the moulding compositions.

By virtue of their excellent flame resistance and weld line strength and good mechanical properties, the thermoplastic moulding compositions according to the invention are suitable for the production of mouldings of all kinds, in particular those requiring elevated resistance to breakage.

The moulding compositions of the present invention may be used for the production of mouldings of any kind. Mouldings may in particular be produced by injection moulding. Examples of mouldings which may be produced are: casings of all kinds, for example for domestic appliances such as juice extractors, coffee machines, food mixers, for office equipment, such as monitors, printers, copiers or cladding sheet for the building sector and automotive components. They may also be used in electrical engineering applications as they have very good electrical properties.

The moulding compositions according to the invention may furthermore, for example, be used to produce the following mouldings or shaped articles:

1. Interior trim for rail vehicles (FR)
2. Hub-caps
3. Casings for electrical devices containing small transformers
4. Casings for information dissemination and transmission devices
5. Casings and cladding for medical purposes
6. Massage devices and casings therefor
7. Toy vehicles for children
8. Sheet wall elements
9. Casings for safety equipment
10. Hatchback spoilers
11. Thermally insulated transport containers
12. Apparatus for keeping or caring for small animals
13. Mouldings for sanitary and bathroom installations
14. Cover grilles for ventilation openings
15. Mouldings for summer houses and sheds
16. Casings for garden appliances.

Another processing method is the production of mouldings by thermoforming of previously produced sheet or film.

The present invention accordingly also provides the use of the moulding compositions according to the invention for the production of mouldings of all kinds, preferably those stated above, and the mouldings made from the moulding compositions according to the invention.

EXAMPLES

Component A

Linear bisphenol A based polycarbonate having a relative solution viscosity of 1.252, measured in $CH_2Cl_2$ as solvent at 25° C. and a concentration of 0.5 g/100 ml.

Component B

Graft polymer of 45 parts by weight of a copolymer prepared from styrene and acrylonitrile in a 72:28 ratio on 55 parts by weight of particulate, crosslinked polybutadiene rubber (average particle diameter $d_{50}=0.40$ μm), produced by emulsion polymerisation.

Component C

Styrene/acrylonitrile copolymer having a styrene/acrylonitrile weight ratio of 72:28 and an intrinsic viscosity of 0.55 dl/g (measured in dimethylformamide at 20° C.).

Component D

Phenoxyphosphazene of the formula

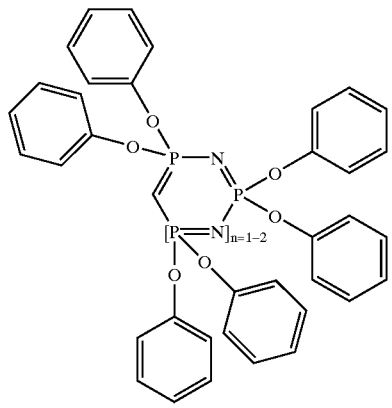

Commercial product P-3800 from Nippon Sodo Co. Ltd., Japan.

Component E

E.1 Triphenyl phosphate, Disflamoll TP® from Bayer AG, Leverkusen, Germany
E.2 m-Phenylene-bis-(diphenyl phosphate). Fyrolflex® from AKZO Nobel Chemicals GmbH, 52349 Duiren, Germany.
E.3 Diphenyidiisopropylidene-bis-(diphenyl phosphate), CR 741 from Daihachi Chemical Ind. Comp., Tokyo. Japan.
E.4 Magnesium diphenyl phosphate

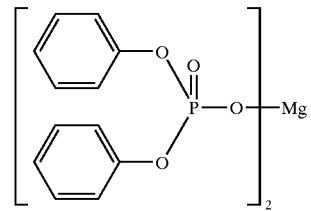

Component F

Tetrafluoroethylene polymer as a coagulated mixture prepared from an SAN graft polymer emulsion corresponding to the above-stated component B in water and a tetrafluoroethylene polymer emulsion in water. The weight ratio of graft polymer B to the tetrafluoroethylene polymer F in the mixture is 90 wt. %:10 wt. %. The tetrafluoroethylene polymer emulsion has a solids content of 60 wt. %, the average particle diameter is between 0.05 and 0.5 μm. The SAN graft polymer emulsion has a solids content of 34 wt. % and an average latex particle diameter of $d_{50}=0.28$ μm.

Production of F

The emulsion of the tetrafluoroethylene polymer (Teflon 30 N from DuPont) is mixed with the emulsion of the SAN graft polymer B and stabilised with 1.8 wt. %, relative to polymer solids, of phenolic antioxidants. At 85 to 95° C., the mixture is coagulated at pH 4 to 5 with an aqueous solution of $MgSO_4$ (Epsom salts) and acetic acid, filtered and washed until virtually free of electrolytes, then the principal quantity of water is removed by centrifugation and the material then dried at 100° C. to yield a powder. This powder may be compounded with the other components in the units described.

Production and Testing of the Moulding Compositions According to the Invention

The components are mixed in a 3 liter internal kneader. The mouldings are produced at 260° C. on an Arburg model 270 E injection moulding machine.

The Vicat B softening point is determined to DIN 53 460 (ISO 306) on bars of dimensions 80×10×4 mm.

Weld line strength is determined by measuring the impact strength to DFN 53 453 at the weld line of test specimens injection moulded from both sides (processing temperature 260° C.) of dimensions 170×10×4 mm.

Stress cracking behavior (ESC behavior) was investigated on bars of dimensions 80×10×4 mm, processing temperature 220° C. The test medium used was a mixture of 60 vol. % toluene and 40 vol. % isopropanol. The test pieces were pre-stressed on a circular arc template (initial elongation in percent) and immersed in the test medium at room temperature. Stress cracking behavior was evaluated on the basis of cracking or failure as a function of initial elongation in the test medium.

TABLE

Moulding compositions and properties thereof

| Component | 1 (Comp.) | 2 | 3 | 4 | 5 | 6 | 7 |
|---|---|---|---|---|---|---|---|
| A | 66.7 | 66.7 | 66.7 | 66.7 | 66.7 | 66.7 | 66.7 |
| B | 7.3 | 7.3 | 7.3 | 7.3 | 7.3 | 7.3 | 7.3 |
| C | 9.4 | 9.4 | 9.4 | 9.4 | 9.4 | 9.4 | 9.4 |
| D | 15.0 | 12.0 | 9.0 | 12.0 | 9.0 | 6.0 | 12.0 |
| E.1 | — | — | — | — | — | 1.5 | — |
| E.2 | — | 3.0 | 6.0 | — | — | 4.5 | — |
| E.3 | — | — | — | 3.0 | 6.0 | — | — |
| E.4 | — | — | — | — | — | — | 3.0 |
| F | 4.2 | 4.2 | 4.2 | 4.2 | 4.2 | 4.2 | 4.2 |
| ak (ISO 180/1A) | 51 | 55 | 55 | 58 | 60 | 53 | 62 |
| Vicat B 120 (ISO 306) | 103 | 98 | 95 | 100 | 97 | 99 | 104 |
| UL 94 V 1.6 mm | V0 | V0 | V0 | V0 | V0 | V0 | V0 |
| ESC behaviour, failure at $\epsilon_x$ [%] | 1.6 | 1.8 | 1.8 | 2.0 | 2.0 | 2.0 | 2.4* |
| $a_n$ (weld line) (DIN 53 453) | 14.0 | 18.5 | 15.9 | 17.5 | 19.5 | 12.2 | 15.3 |

*no failure.

What is claimed is:

1. Thermoplastic moulding compositions containing:

A) 40 to 99 parts by weight of at least one member selected from the group consisting of aromatic polycarbonate and polyester carbonate;

B) 0.5 to 60 parts by weight of graft polymer of
B.1) 5 to 95 wt. % of one or more vinyl monomers on
B.2) 95 to 5 wt. % of one or more grafting backbones having a glass transition temperature of −10° C.;

C) 0 to 45 parts by weight of at least one thermoplastic polymer selected from the group consisting of vinyl (co)polymers and polyalkylene terephthalates;

C) 0.1 to 50 parts by weight of at least one component selected from the group consisting of phosphazenes of the formulae

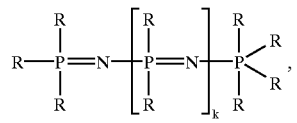

and

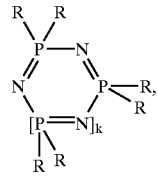

in which
R is in each case identical or different and denotes amino, $C_1$ to $C_8$ alkyl, in each case optionally halogenated, or $C_1$ to $C_8$ alkoxy, $C_5$ to $C_6$ cycloalkyl, $C_6$ to $C_{20}$ aryl, $C_6$ to $C_{20}$ aryoxy, or $C_7$ to $C_{12}$ aralkyl, in each case optionally substituted by alkyl and/or halogen, and
k denotes 0 or a number from 1 to 15;

E) 0.5 to 20 parts by weight of at least one phosphorus compound selected from the group consisting of general formulae (IIa) and (IId),

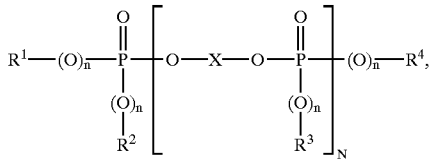

in which
$R^1$, $R^2$, $R^3$ and $R^4$ mutually independently denote at least one member selected from the group consisting of $C_1$ to $C_8$ alkyl, in each case optionally halogenated, $C_5$ to $C_6$ cycloalkyl, $C_6$ to $C_{20}$ aryl and $C_7$ to $C_{12}$ aralkyl, In each case optionally substituted by alkyl and halogen,
n mutually independently mean 0 or 1,
N means 0.3 to 20, and
X means a mono- or polycyclic aromatic residue having 6 to 30 C atoms; and

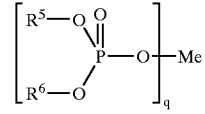

in which
$R^5$ and $R^6$ mutually independently mean at least one member selected from the group consisting of optionally halogenated $C_1$–$C_{24}$ alkyl, $C_5$–$C_6$ cycloalkyl, $C_6$–$C_{20}$ aryl and $C_7$–$C_{12}$ aralkyl, in each case optionally substituted by halogen and $C_1$–$C_{10}$ alkyl, or $R^5$ and $R^6$ form an alkylene chain, Me denotes a metal selected from at least one member of the group consisting of main groups 1 to 3 and subgroups VIII 1B and 2B of the periodic system, and q is determined by the valency of the metal ion; and F) 0.05 to 5 parts by weight of fluorinated polyolefin.

2. Moulding compositions according to claim 1 containing 60 to 98.5 parts by weight of A 1 to 40 parts by weight of B 0 to 30 parts by weight of C 2 to 35 parts by weight of D 1 to IS parts by weight of E and 0.1 to 1 part by weight of F.

3. Moulding compositions according to claims 1 containing 2 to 25 parts by weight of B 5 to 25 parts by weight of D 2 to 15 parts by weight of E 0.1 to 0.5 parts by weight of F.

4. Moulding compositions according to claim 1 containing 2 to 25 parts by weight of C.

5. Moulding compositions according to claim 1, wherein the average particle diameter $d_{50}$ of component B is 0.05 to 5 µm.

6. Moulding compositions according to claim 1, wherein the average particle diameter $d_{50}$ of component B is 0.1 to 0.5 µm.

7. Moulding compositions according to claim 1, wherein vinyl monomers B.1 are mixtures prepared from B.1.1 50 to 99 parts by weight of vinyl aromatics and/or ring-substituted vinyl aromatics and/or methaciylic acid ($C_1$–$C_4$)-alkyl esters and B.1.2 1 to 50 parts by weight of vinyl cyanides and/or (meth)acrylic acid ($C_1$–$C_8$)-alkyl esters and/or derivatives of unsaturated carboxylic acids.

8. Moulding compositions according to claim 1, wherein the grafting backbone B.2 is selected from at least one rubber from the group consisting of diene rubbers, EP(D)M rubbers, acrylate, polyurethane, silicone, chloroprene and ethylene/vinyl acetate rubbers.

9. Moulding compositions according to claim 1, wherein component D is selected from the group consisting of propoxyphosphazene, phenoxyphosphazene, methylphenoxyphosphazene, aminophosphazene and fluoroalkylphosphazenes.

10. Moulding compositions according to claim 1 containing at least one additive selected from the group comprising lubricants and mould release agents, nucleating agents, antistatic agents, stabilisers, dyes and pigments.

11. Moulding compositions according to claim 1 containing further flame retardants which differ from component E.

12. Process for the production of moulding compositions according to claim 1, wherein components A to F and optionally further additives are mixed and melt-compounded.

13. Mouldings produced from moulding compositions according to claim 1.

14. Casing parts according to claim 13.

* * * * *

UNITED STATES PATENT AND TRADEMARK OFFICE
CERTIFICATE OF CORRECTION

PATENT NO. : 6,613,822 B1
DATED : September 2, 2003
INVENTOR(S) : Thomas Eckel, Michael Zobel, Dieter Wittmann It is certified that error appears in the above-identified patent and that said Letters Patent is hereby corrected as shown below:

Column 1,
Line 40, delete "freight" and insert -- weight --.
Line 56, delete "." and insert -- , --.
Lines 61 through 65, the formula should appear as follows with the comma following the formula number (1a):

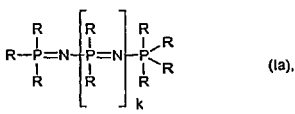

Column 2,
Lines 1 through 9, the formula should appear as follows with the comma following the formula number (1b):

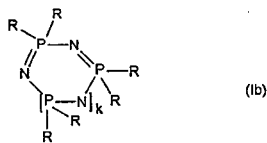

Line 13, delete the "." and insert -- , --.
Line 13, delete "$C_9$" and insert -- $C_8$ --.
Line 15, delete "$C_4$" and insert -- $C_8$ --.
Line 20, delete "and,or" and insert -- and/or --.
Lines 27 through 35, the formula should appear as follows with the comma following formula number (11a):

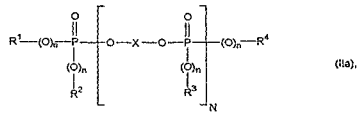

Column 3,
Line 17, delete "*Chemistry,*" and insert -- *Chemistry* --.
Lines 35 through 40, the formula should appear as follows with the comma following formula number (111):

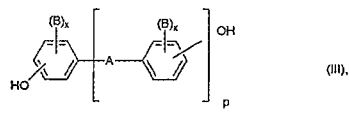

Line 48, delete "fused." and insert -- fused, --.

Column 6,
Line 18, delete "B.1" and insert -- B.1.1 --.
Line 42, delete "diene." and insert -- diene, --.

UNITED STATES PATENT AND TRADEMARK OFFICE
CERTIFICATE OF CORRECTION

PATENT NO.      : 6,613,822 B1
DATED           : September 2, 2003
INVENTOR(S)     : Thomas Eckel, Michael Zobel, Dieter Wittmann It is certified that error appears in the above-identified patent and that said Letters Patent is hereby corrected as shown below:

Column 7,
Line 60, delete "1H." and insert -- H. --.

Column 9,
Line 16, delete "hive" and insert -- have --.
Line 17, delete "O05" and insert -- 0.5 --.
Lines 29 through 41, the formulae should appear as follows with the comma following the formula numbers (1a) and (1b):

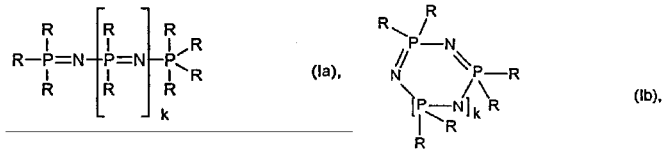

Line 43, insert -- . -- at the end of sentence.
Line 54, delete "10".

Column 11,
Line 7, delete "ethyl.ni-," and insert -- ethyl,n-, --.

Column 14,
Line 28, delete "phosphate)." and insert -- phosphate), --.
Line 29, delete "Duiren" and insert -- Dueren --.

Column 15,
Line 16, delete "DFN" and insert -- DIN --.
Line 65, delete "C)" and insert -- D) --.

Column 16,
Line 47, delete "In" and insert -- in --.

UNITED STATES PATENT AND TRADEMARK OFFICE
CERTIFICATE OF CORRECTION

PATENT NO.    : 6,613,822 B1
DATED         : September 2, 2003
INVENTOR(S)   : Thomas Eckel, Michael Zobel, Dieter Wittmann It is certified that error appears in the above-identified patent and that said Letters Patent is hereby corrected as shown below:

Column 17,
Line 15, delete "IS" and insert -- 18 --.
Line 17, delete "claims" and insert -- claim --.

Signed and Sealed this

Thirty-first Day of August, 2004

JON W. DUDAS
*Director of the United States Patent and Trademark Office*